No. 640,644. Patented Jan. 2, 1900.
H. FALCONNET & M. PERODEAUD.
PROCESS OF MANUFACTURING INDIA RUBBER TIRES.
(Application filed Nov. 9, 1899.)

(No Model.)

UNITED STATES PATENT OFFICE.

HENRI FALCONNET AND MAURICE PERODEAUD, OF CHOISY-SUR-SEINE, FRANCE.

PROCESS OF MANUFACTURING INDIA-RUBBER TIRES.

SPECIFICATION forming part of Letters Patent No. 640,644, dated January 2, 1900.

Application filed November 9, 1899. Serial No. 736,399. (No specimens.)

*To all whom it may concern:*

Be it known that we, HENRI FALCONNET and MAURICE PERODEAUD, citizens of the Republic of France, and residents of Choisy-sur-Seine, in the Republic of France, have invented certain new and useful Improvements in Processes of Manufacturing India-Rubber Tires for the Wheels of Vehicles and other Like Articles, of which the following is a full, clear, and exact specification.

The conditions with which a wheel-tire must comply are difficult to realize in practice, because they are up to a certain point contradictory. The difficulties which are encountered in order to give the tire resiliency and flexibility, on the one hand, and, on the other hand, the power to resist the various strains of traction, compression, friction, cutting, tearing, and the like may well be conceived. Logically, when tires are employed which are entirely resilient it is preferable to give them a certain amount of resistance, and consequently a relative rigidity at the external periphery, more particularly at the points where they are in contact with the ground and where they receive the reaction of the latter and the action of the weight of the vehicle transmitted by the wheel on which this tire is fixed. On the other hand, the central part of the tire must have great elasticity. These conditions are well realized by pneumatic tires; but the want of strength of these latter renders their use difficult and even dangerous in the case of heavy vehicles. Efforts have been made to make solid resilient tires, and these tires have been composed of layers of different materials of variable elasticity combined by various processes of adhesion, grouping, and fixing. Such tires have only a relative cohesion.

Figure 2:
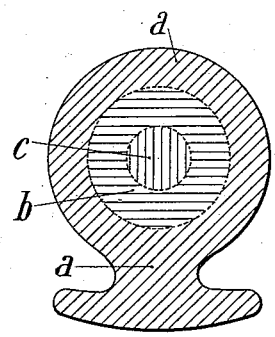
Figure 1:
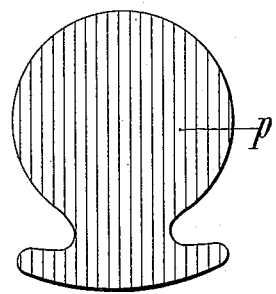

The invention which forms the object of the present application relates to a solid-rubber tire obtained by means of a single original substance, such as pure commercial rubber or a mixture of same converted (after its manufacture into a tire) by a special process enabling a resiliency or flexibility to be imparted to it which increases from the periphery to the center. Thus, assuming, for instance, that we start with a homogeneous tire $p$, of ordinary commercial rubber, such as is shown in the accompanying drawings in transverse section in Figure 1, the process which we will now describe enables successive zones, such as $a\ b\ c$, Fig. 2, the number of which is variable at will, to be determined therein, the axial zone $c$ being of great flexibility, the zone $b$ of a less flexibility, and the zone $a$ still less than $b$.

The principle of the method employed in our invention consists in subjecting the tire formed by known industrial methods to a series of vulcanizations alternating with subsequent refrigerations, the number of alternate operations corresponding to the number of zones of different flexibility, such as $a\ b\ c$, which it is desired to form in the tire. Our method is preferably employed with an india-rubber as far as possible free from mineral substances which are good conductors of heat.

The prepared tire $p$ is heated at first to the temperature of 110° centigrade—that is to say, to about the maximum temperature necessary for producing a vulcanization. This first slight vulcanization is extended to the whole mass $p$, and for this object we maintain this temperature until the vulcanization has had time to spread from the periphery to the center. Then we congeal the vulcanized tire for the first time in a refrigerating apparatus at a temperature varying between 10° and 20° centigrade. We maintain that temperature until the temperature is the same throughout the whole tire. The tire of which the whole mass is congealed is then vulcanized afresh and for this object carried to a temperature higher than in the first case—say to 150° centigrade. This temperature is not maintained long enough for the fresh vulcanization of the tire to spread to the axial zone $c$, in which we thus create a sort of reserve of cold, the bad conductibility of india-rubber facilitating this phenomenon. A tire the manufacture of which is interrupted at this moment will then comprise two zones of different flexibility— viz., the axial zone $c$, which is very flexible, and a peripheral zone of a less flexibility extending from the part $c$ to the surface.

In order to divide the mass extending from $c$ to the periphery into a zone $b$ of greater flexibility than the outer zone $a$, it is sufficient, after the second vulcanization at high temperature, to congeal the tire afresh and then to subject it to a third vulcanization for a time short enough for the heating to remain confined to the layer $a$ by reason of the reserve of cold in the other layers. We lay stress on this point that the successive vulcanizations must necessarily alternate with congealations, and it is these alternations which enable the improved result indicated by us to be attained. As regards the number of these alternations and their durations, of course they may vary according to the number of zones which it is desired to produce in the mass of the tire by reason of the special uses to which the tire is to be put and according to the degree of flexibility, resiliency, or resistance which it is desired to obtain.

Although this process enabling zones of a flexibility increasing from the periphery to the center to be obtained in the mass of a tire is more particularly applicable for a tire prepared industrially from a homogeneous mass, it may also be employed with a tire prepared with fragments of different substances joined together by adhesion and pressure by any of the known methods.

We claim as our invention—

The process of manufacturing india-rubber tires for the wheels of vehicles and other like articles which consists in creating, in the mass of the tire, zones of different resiliency or flexibility increasing from the periphery to the center, by subjecting the tire formed by the ordinary industrial methods and subjected to a first general vulcanization, to a series of refrigerations, at temperatures below zero, alternating with vulcanizations at high temperature of increasingly shorter duration, whereby the vulcanization interrupted by the congealing of the core of the tire, is effected to decreasing depths, substantially as hereinbefore set forth.

In witness whereof we have hereunto set our hands in presence of two witnesses.

HENRI FALCONNET.
MAURICE PERODEAUD.

Witnesses:
 EDWARD P. MACLEAN,
 ANDRÉ MOSTICKER.